(12) United States Patent
Wiebenga et al.

(10) Patent No.: US 12,463,265 B2
(45) Date of Patent: Nov. 4, 2025

(54) BATTERY MONITORING SYSTEM FOR MEASURING CARBON DIOXIDE TO DETECT IMBALANCE IN A GROUP OF PARALLEL LITHIUM-ION BATTERY CELLS

(71) Applicant: GM GLOBAL TECHNOLOGY OPERATIONS LLC, Detroit, MI (US)

(72) Inventors: Michelle H. Wiebenga, Farmington Hills, MI (US); Lei Wang, Rochester Hills, MI (US); Rasoul Salehi, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 462 days.

(21) Appl. No.: 18/073,000

(22) Filed: Dec. 1, 2022

(65) Prior Publication Data

US 2024/0186598 A1   Jun. 6, 2024

(51) Int. Cl.
| | |
|---|---|
| *H01M 10/48* | (2006.01) |
| *G01N 33/00* | (2006.01) |
| *G01R 31/396* | (2019.01) |
| *H01M 10/42* | (2006.01) |
| *H01M 50/317* | (2021.01) |
| *H02J 7/00* | (2006.01) |

(52) U.S. Cl.
CPC ......... *H01M 10/48* (2013.01); *G01N 33/004* (2013.01); *G01R 31/396* (2019.01); *H01M 10/425* (2013.01); *H01M 50/317* (2021.01); *H02J 7/0048* (2020.01); *H02J 7/00719* (2020.01)

(58) Field of Classification Search
CPC ............... H01M 10/48; H01M 10/425; H01M 10/4207; H01M 10/441; H01M 10/482; H01M 50/317; H01M 2220/20; G01N 33/004; G01R 31/396; H02J 7/0048; H02J 7/00719; H02J 7/0013; Y02E 60/10; B60L 58/10; B60L 58/12
See application file for complete search history.

(56) References Cited

U.S. PATENT DOCUMENTS

| | | | |
|---|---|---|---|
| 2012/0308903 A1* | 12/2012 | Masel ................ | B01J 31/0209 |
| | | | 564/8 |
| 2018/0257027 A1* | 9/2018 | Desai ..................... | C08J 5/2231 |
| 2021/0140056 A1* | 5/2021 | Jiao ........................ | C25B 9/19 |
| 2021/0245627 A1* | 8/2021 | Ferguson ............. | G05D 1/0291 |

(Continued)

FOREIGN PATENT DOCUMENTS

WO   WO-2019200115 A1 *  10/2019  ............... C25B 1/00

OTHER PUBLICATIONS

U.S. Appl. No. 17/522,553, filed Nov. 9, 2021, Wang et al.
Geng et al. High accuracy in-site direct gas analysis of Li-ion batteries. Journal of Power Sources 466 (2020)228211.

*Primary Examiner* — Shelby A Turner
*Assistant Examiner* — Yaritza H Perez Bermudez (57) ABSTRACT

A battery monitoring system includes a carbon dioxide sensing system configured to selectively measure carbon dioxide concentrations within a plurality of battery cells, respectively, that are connected in parallel. A controller is configured to detect cathode overpotential in the plurality of battery cells in response to the measured carbon dioxide concentrations of the plurality of battery cells.

13 Claims, 4 Drawing Sheets

(56) References Cited

U.S. PATENT DOCUMENTS

2023/0142289 A1* 5/2023 Wang .................. H01M 10/482
    429/90
2023/0184845 A1* 6/2023 Lim ....................... B60L 58/10
    324/426

* cited by examiner

Upper Cut-Off Voltage

BATTERY MONITORING SYSTEM FOR MEASURING CARBON DIOXIDE TO DETECT IMBALANCE IN A GROUP OF PARALLEL LITHIUM-ION BATTERY CELLS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to a battery monitoring system for battery cells.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving. A battery monitoring system monitors operation of the battery system. Manufacturers of EVs are pursuing increased power density to increase the range of the EVs.

SUMMARY

A battery monitoring system includes a carbon dioxide sensing system configured to selectively measure carbon dioxide concentrations within a plurality of battery cells, respectively, that are connected in parallel. A controller is configured to detect cathode overpotential in the plurality of battery cells in response to the measured carbon dioxide concentrations of the plurality of battery cells.

In other features, the controller is configured to a) cause the carbon dioxide sensing system to measure a first carbon dioxide concentration of one of the plurality of battery cells prior to a charging event; b) cause the one of the plurality of battery cells to be charged; c) cause the carbon dioxide sensing system to measure a second carbon dioxide concentration of the one of the plurality of battery cells after the charging event; and d) detect cathode overpotential when a difference between the second carbon dioxide concentration and the first carbon dioxide concentration is greater than a predetermined threshold. The controller is configured to determine a state of charge of the one of the plurality of battery cells and to perform (c) and (d) when the state of charge of the one of the battery cells is greater than a predetermined state of charge.

In other features, the controller is configured to alter at least one of charging or discharging parameters of the plurality of battery cells in response to detecting the cathode overpotential. The controller is configured to a) cause the carbon dioxide sensing system to measure a plurality of carbon dioxide concentrations of the plurality of battery cells, respectively; and b) detect cathode overpotential when a difference between at least one of the plurality of carbon dioxide concentrations of the plurality of battery cells and an average carbon dioxide concentration of others of the plurality of battery cells is greater than a predetermined threshold.

In other features, the controller is configured to alter at least one of charging or discharging parameters of the plurality of battery cells in response to detecting the cathode overpotential. The carbon dioxide sensing system includes carbon dioxide sensors arranged in each of the plurality of battery cells. The carbon dioxide sensing system includes a carbon dioxide sensor that is multiplexed to the plurality of battery cells.

In other features, the carbon dioxide sensing system includes a plurality of valves, a first plurality of gas lines fluidly connecting the plurality of battery cells to inlets of the plurality of valves, and a second plurality of gas lines fluidly connected outlets of the plurality of valves. The carbon dioxide sensing system further includes a carbon monoxide sensor selectively connected by the plurality of valves, the first plurality of gas lines, and the second plurality of gas lines to one of the plurality of battery cells.

A method for monitoring overpotential in a battery system includes measuring carbon dioxide concentrations within a plurality of battery cells connected in parallel; and selectively detecting cathode overpotential in the plurality of battery cells in response to the measured carbon dioxide concentrations within the plurality of battery cells.

In other features, the method includes a) measuring a first carbon dioxide concentration of one of the plurality of battery cells prior to a charging event; b) charging the one of the plurality of battery cells; c) measuring a second carbon dioxide concentration of one of the plurality of battery cells after the charging event; and d) detecting cathode overpotential when a difference between the second carbon dioxide concentration and the first carbon dioxide concentration is greater than a predetermined threshold.

In other features, the method includes determining a state of charge of the one of the battery cells; and performing (c) and (d) when the state of charge of the one of the battery cells is greater than a predetermined state of charge.

In other features, the method includes altering at least one of charging or discharging parameters of the plurality of battery cells in response to detecting the cathode overpotential.

In other features, the method includes measuring a plurality of carbon dioxide concentrations of the plurality of battery cells; and detecting cathode overpotential when a difference between at least one of the plurality of carbon dioxide concentrations of the plurality of battery cells and an average carbon dioxide concentration of others of the plurality of battery cells is greater than a predetermined threshold.

In other features, the method includes altering at least one of charging or discharging parameters of the plurality of battery cells in response to detecting the cathode overpotential. The method includes arranging carbon dioxide sensors arranged in each of the plurality of battery cells. The method includes multiplexing a carbon dioxide sensor to the plurality of battery cells.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the battery monitoring system is described herein in the context of EVs, the battery monitoring system can be used in stationary applications and/or in other applications.

Detecting imbalanced aging among a group of battery cells that are connected in parallel is challenging since voltages of the battery cells are the same. The battery monitoring system according to the present disclosure detects imbalanced aging caused by cathode overpotential for battery cells in a group of parallel-connected battery cells.

A concentration of carbon dioxide ($CO_2$) gas is sampled and measured in an enclosure of each battery cell. $CO_2$ gas is generated when a lithium-ion battery cell with a metal oxide cathode is overcharged. Overcharging causes molecular oxygen ($O_2$) to be released from the cathode electrodes. The $O_2$ reacts with electrolyte in the enclosure of the battery cell and produces $CO_2$. As the overpotential of the cathode electrodes increases, more $CO_2$ is generated.

Cathode electrode overpotential may occur if an N:P ratio of one battery cell is higher than others in a group of parallel-connected battery cells. The N/P ratio corresponds to an areal capacity of negative to positive electrodes. The N:P ratio of a battery cell may increase when a battery cell has one or more torn cathode tab(s). The N:P ratio of a battery cell may also increase due to delamination and/or loss of conductivity of a portion of the cathode active material.

Figure 1:
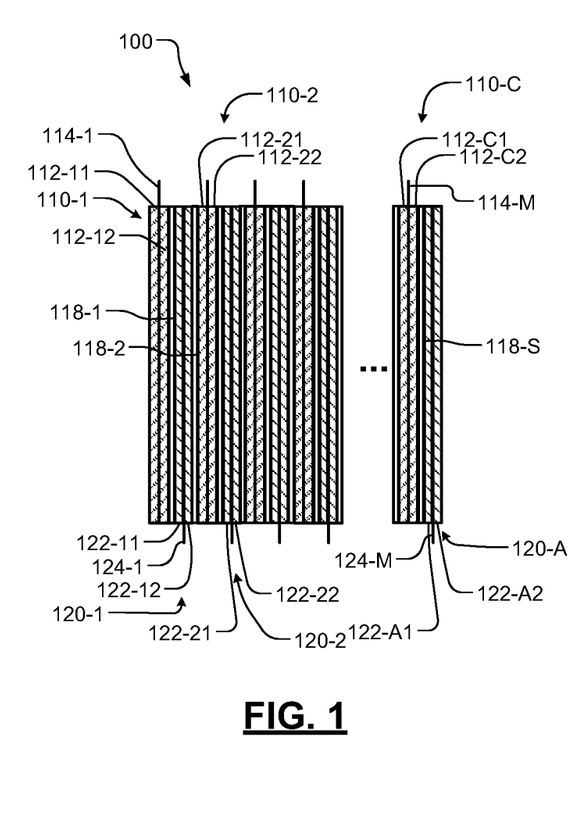
FIG. 1 is a side cross sectional view of an example of a battery cell.

Referring now to FIG. 1, a battery cell 100 includes cathode electrodes 110-1, 110-2, . . . , and 110-C (collectively or individually cathode electrodes 110) and anode electrodes 120-1, 120-2, . . . , and 120-A (collectively or individually anode electrodes 120). In some examples, the cathode electrodes 110 and anode electrodes 120 are arranged in an alternating arrangement with separators 118-1, . . . , and 118-S (collectively or individually separators 118) arranged therebetween.

The cathode electrodes 110-1, 110-2, . . . , and 110-C include cathode active material 112-11, 112-12, . . . , 112-C1, and 112-C2 arranged on opposite sides of cathode current collectors 114-1, . . . , and 114-C, respectively. In some examples, the cathode current collectors are made of aluminum. The anode electrodes 120-1, 120-2, . . . , and 120-C include anode active material 122-11, 122-12, . . . , 122-C1, and 122-C2 arranged on opposite sides of anode current collectors 124-1, . . . , and 124-C, respectively. In some examples, the anode current collectors 124 are made of copper. In FIG. 1, A, C and S are integers that are greater than one. In some examples, the battery cells include lithium-ion battery cells, and the cathode active material includes metal oxide cathode active material.

The present disclosure measures $CO_2$ within each cell to detect cathode overpotential. The concentration of $CO_2$ that is measured correlates to the severity of overpotential. $CO_2$ generation is highly sensitive to cathode overpotentials. For high voltage cycling, $CO_2$ generation is a primary gassing source.

More particularly, the present disclosure detects cell imbalance in a group of lithium-ion battery cells connected in parallel by measuring $CO_2$ concentrations within the battery cells. $CO_2$ is measured in the enclosure of each battery cell. If the $CO_2$ concentration in a battery cell is very high, the cathode electrode of that battery cell is determined to have reached an overpotential. The concentration of $CO_2$ that is detected is correlated to the severity of the cathode overpotential. Overpotential can be detected by measuring the change in $CO_2$ concentration from a start to an end of a charge event. Alternately, overpotential can be detected by measuring $CO_2$ concentrations and comparing $CO_2$ concentrations to a function (e.g., such as an average) of other battery cells in the parallel group.

Figure 2:
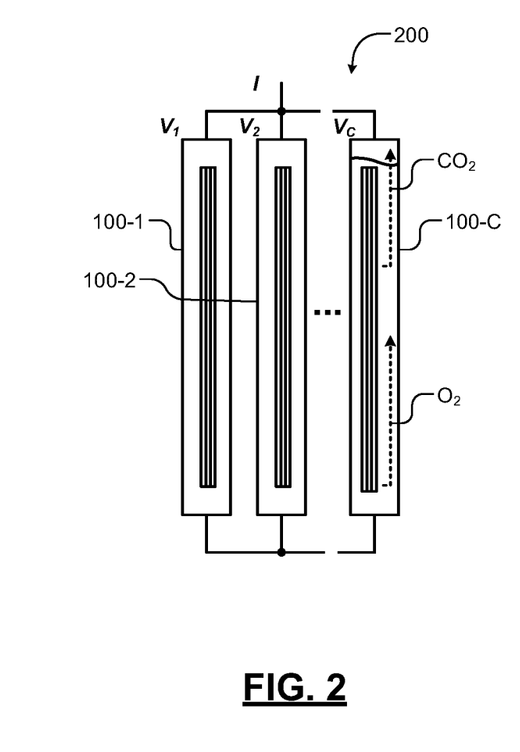
FIG. 2 is a functional block diagram of an example of a battery including a plurality of battery cells connected in parallel.

Referring now to FIG. 2, a battery cell 200 includes a plurality of battery cells 100-1, 100-2, . . . , and 100-C (where C is an integer greater than one) that are connected in parallel. Voltages $V_1$, $V_2$, . . . , and $V_c$ of the battery cells 100-1, 100-2, and 100-C are the same due to the parallel connection.

For example, a defect in the battery cell 100-C causes an increase in a N:P ratio due to a torn tab, delamination, loss of conductivity or another defect. One or more cathode electrodes in the battery cell 100-C is charged to a higher potential than the cathode electrodes of the other battery cells 100-1 and 100-2. However, the cell voltage of the battery cells 100-1, 100-2 and 100-C will be the same.

Due to the imbalance, molecular oxygen ($O_2$) gas is generated in the battery cell 100-C during overcharging. The molecular oxygen $O_2$ reacts with electrolyte and produces $CO_2$. The battery monitoring system according to the present disclosure measures the $CO_2$ that is released and selectively detects overpotential based thereon.

Figure 3A:
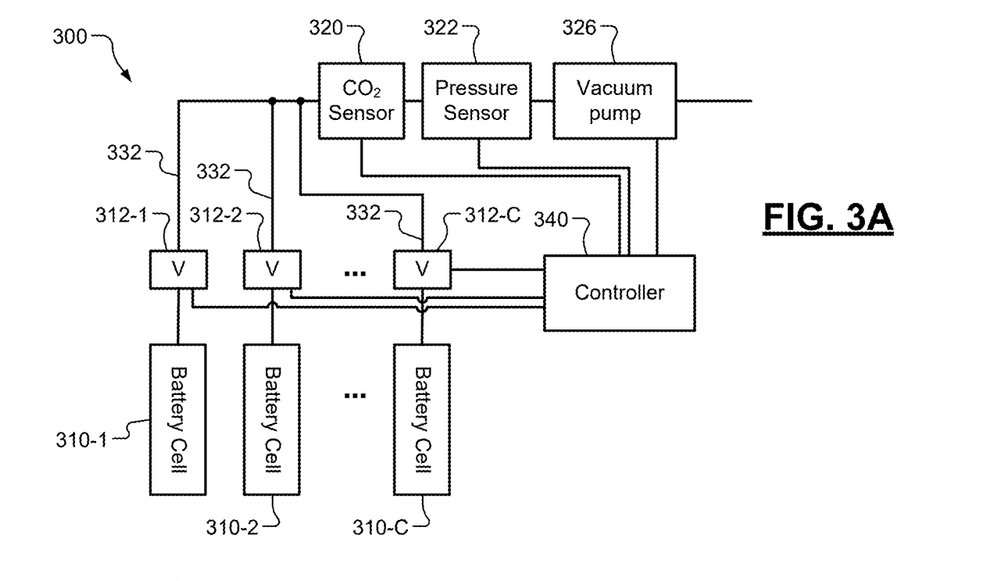
FIGS. 3A to 3C illustrate examples of battery monitoring systems including carbon dioxide sensors according to the present disclosure.

There are a variety of ways to sample concentrations of $CO_2$ in the battery cells. Referring now to FIG. 3A, a plurality of battery cells 310-1, 310-2, . . . , and 310-C are selectively connected by gas lines 332 and valves 312-1, 312-2, . . . , and 312-C to a $CO_2$ sensor 320 and a pressure sensor 322. In other words, the $CO_2$ sensor 320 is multiplexed (sequentially connected by the valves to each of the battery cells).

A vacuum pump 326 creates vacuum in the gas lines 332 to cause gases in the enclosures of the battery cells to be sampled when the corresponding valve is opened. When sensing $CO_2$, one of the valves 312 corresponding to the battery cell 100 to be sampled is opened, gas within the battery cell 100 is sampled, and $CO_2$ concentrations are sensed. A controller 340 controls the valves, the vacuum pump, the $CO_2$ sensor, and the pressure sensor to sample the $CO_2$ concentrations in each of the battery cells. The controller 340 may also control charging and/or discharging of the battery cells or communicate with another controller that controls charging and/or discharging of the battery cells.

Figure 3B:
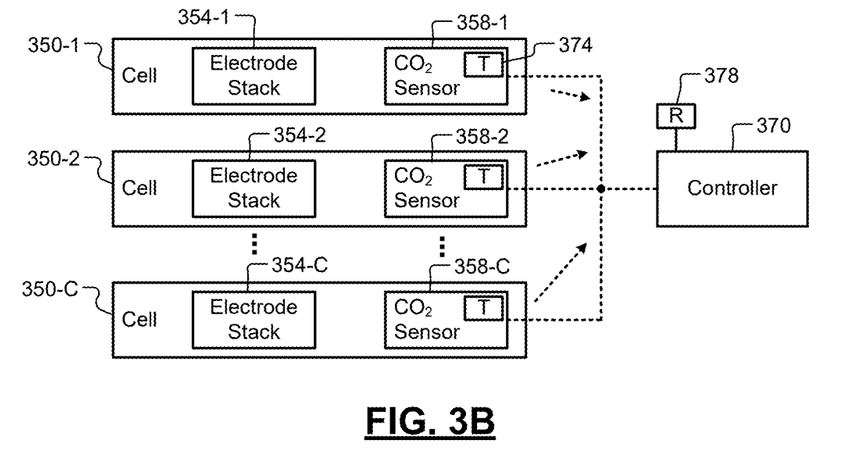

Referring now to FIG. 3B, a plurality of battery cells 350-1, 350-2, . . . , and 350-C include an electrode stack 354-1, 354-2, . . . , and 354-C and $CO_2$ sensors 358-1, 358-2, . . . , and 358-C arranged in the enclosure of the battery cell. A controller 370 receives $CO_2$ concentrations from the battery cells 350-1, 350-2, . . . , and 350-C in a wired or wireless manner. If wireless communication is used, the plurality of battery cells 350-1, 350-2, . . . , and 350-C include wireless transmitters 374 and the controller 370 communicates with a receiver 378.

Figure 3C:
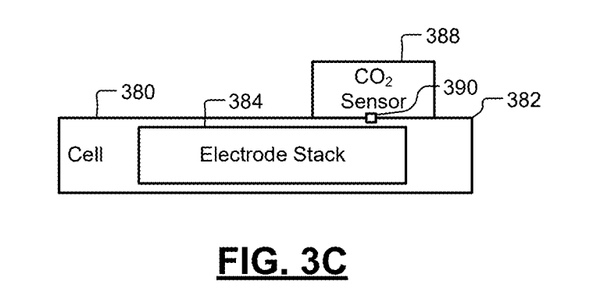

Referring now to FIG. 3C, a battery cell 380 includes an electrode stack 384 arranged in an enclosure 382. In some examples, the enclosure 382 includes a pouch cell, a prismatic cell, or other type of battery cell format. A $CO_2$ sensor 388 is attached to the enclosure 382 and samples gas within the battery cell 380 through an opening 390 in the enclosure 382.

Figure 4:
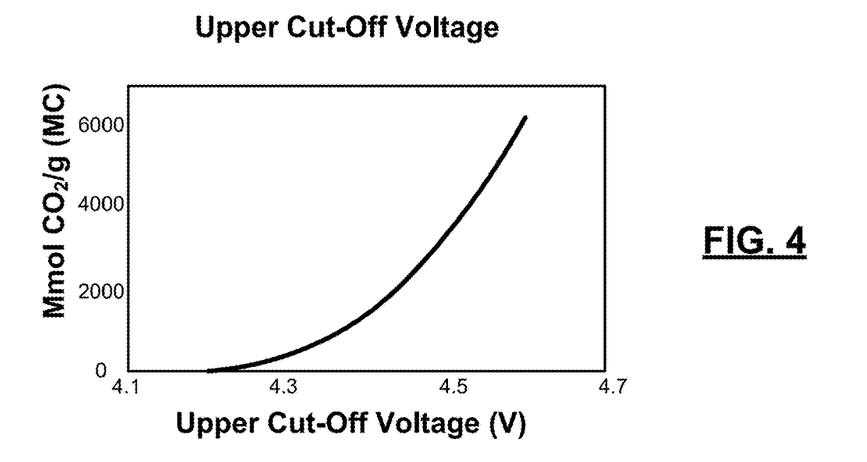
FIG. 4 is a graph illustrating measured carbon dioxide as a function of upper cut-off voltage.
Figure 5:
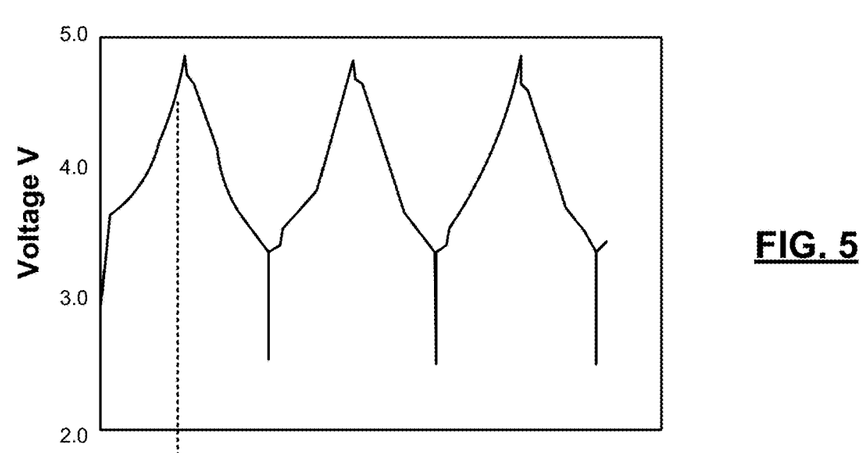
FIGS. 5 and 6 are graphs illustrating voltage and ion current as a function of time during charging.
Figure 6:
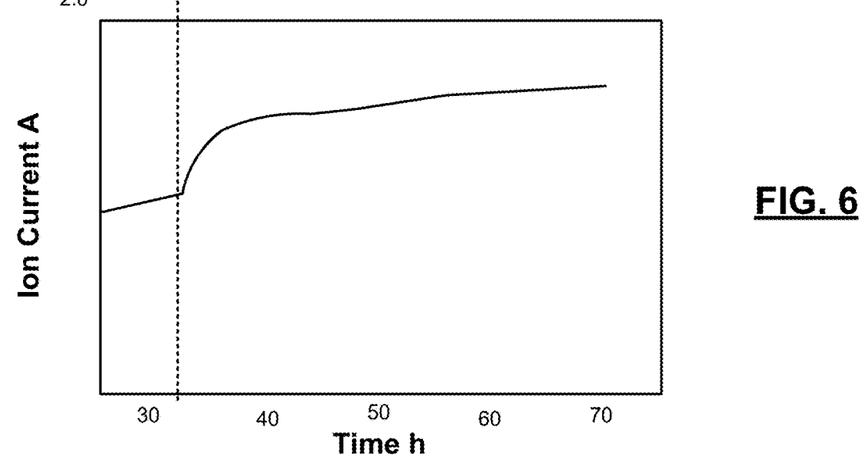

Referring now to FIGS. 4 to 6, the concentration of $CO_2$ in battery cell enclosure can be used to detect temperature increases in the battery cell. In FIG. 4, measured $CO_2$ concentrations increase as a function of battery cell voltage. In FIGS. 5 and 6, voltage and current are shown as a function of time during a charging cycle. As the voltage increases beyond a predetermined cut-off voltage during charging, the measured $CO_2$ increases as the voltage increases.

Figure 7:
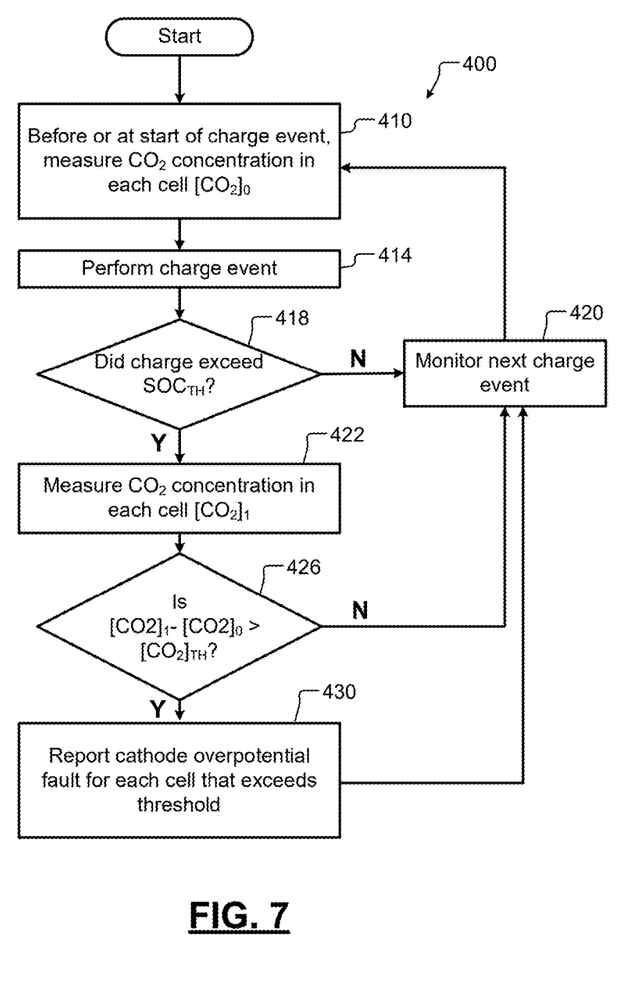
FIG. 7 is a flowchart of an example of a method for monitoring a battery system to detect cathode electrode overpotential based on measured carbon dioxide in each battery cell according to the present disclosure.

Referring now to FIG. 7, a method 400 for measuring $CO_2$ to identify overpotential faults. At 410, before or at start of charge event, $CO_2$ concentration is measured in each cell $[CO_2]_0$. At 414, a charge event is performed. At 418, the method determines whether the charge exceeds a state of charge (SOC) threshold. In some examples, the SOC threshold is 70%, 80%, 90% or another SOC threshold. If 420 is false, the next charging event is monitored.

If 418 is true, $CO_2$ concentration is measured in each cell $[CO_2]_1$. At 426, the method determines whether a difference between $[CO_2]_1$ and $[CO_2]_0$ is greater than a predetermined threshold $[CO_2]_{TH}$. If 426 is false, the method returns to 420. If 426 is true, a cathode overpotential fault for each cell that exceeds threshold is reported and remedial action can be taken. For example, the controller is configured to alter a charging or discharging parameter of the battery cells in response to detecting the cathode overpotential. For example, a lower charging voltage, a lower charging current, a lower charging rate, a lower target SOC, etc. can be used. For example, a lower discharging voltage, a lower discharging current, a lower discharging rate, etc. can be used.

Figure 8:
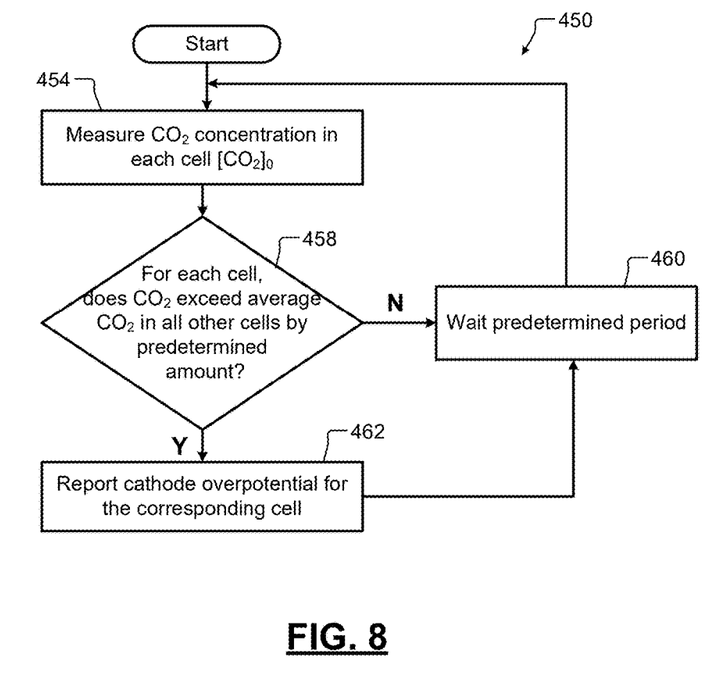
FIG. 8 is a flowchart of an example of a method for monitoring a battery system to detect cathode electrode overpotential based on measured carbon dioxide concentrations in each battery cell relative to other battery cells according to the present disclosure.

Referring now to FIG. 8, a method 450 measures $CO_2$ to identify overpotential faults. At 454, $CO_2$ concentration is measured in each cell $[CO_2]_0$. At 458, for each cell, the method determines whether $CO_2$ exceeds a function (e.g., such as an average) of $CO_2$ concentration of the battery cells by predetermined amount. If 458 is false, the method waits a predetermined period at 460 and then returns to 454. If 458 is true, a cathode overpotential fault for each cell that exceeds threshold is reported and remedial action can be taken at 462.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery monitoring system comprising:
   a carbon dioxide sensing system configured to selectively measure carbon dioxide concentrations within a plurality of battery cells, respectively, that are connected in parallel; and
   a controller configured to detect cathode overpotential in the plurality of battery cells in response to the measured carbon dioxide concentrations of the plurality of battery cells;
   wherein the controller is configured to:
      cause the carbon dioxide sensing system to measure a plurality of carbon dioxide concentrations of the plurality of battery cells, respectively;
      detect cathode overpotential when a difference between at least one of the plurality of carbon dioxide concentrations of the plurality of battery cells and an average carbon dioxide concentration of others of the plurality of battery cells is greater than a predetermined threshold; and
      alter at least one of charging or discharging parameters of the plurality of battery cells in response to detecting the cathode overpotential.

2. The battery monitoring system of claim 1, wherein the controller is configured to:
   a) cause the carbon dioxide sensing system to measure a first carbon dioxide concentration of one of the plurality of battery cells prior to a charging event;
   b) cause the one of the plurality of battery cells to be charged;
   c) cause the carbon dioxide sensing system to measure a second carbon dioxide concentration of the one of the plurality of battery cells after the charging event; and
   d) detect cathode overpotential when a difference between the second carbon dioxide concentration and the first carbon dioxide concentration is greater than a predetermined threshold.

3. The battery monitoring system of claim 2, wherein the controller is configured to determine a state of charge of the one of the plurality of battery cells and to perform (c) and (d) when the state of charge of the one of the battery cells is greater than a predetermined state of charge.

4. The battery monitoring system of claim 1, wherein the controller is configured to alter at least one of charging or discharging parameters of the plurality of battery cells in response to detecting the cathode overpotential.

5. The battery monitoring system of claim 1, wherein the carbon dioxide sensing system includes carbon dioxide sensors arranged in each of the plurality of battery cells.

6. The battery monitoring system of claim 1, wherein the carbon dioxide sensing system includes a carbon dioxide sensor that is multiplexed to the plurality of battery cells.

7. The battery monitoring system of claim 6, wherein the carbon dioxide sensing system includes:
   a plurality of valves;
   a first plurality of gas lines fluidly connecting the plurality of battery cells to inlets of the plurality of valves; and
   a second plurality of gas lines fluidly connected outlets of the plurality of valves.

8. A method for monitoring overpotential in a battery system comprising:
   measuring carbon dioxide concentrations within a plurality of battery cells connected in parallel using a carbon dioxide sensing system;
   selectively detecting with a controller cathode overpotential in the plurality of battery cells in response to the measured carbon dioxide concentrations within the plurality of battery cells;
   measuring a plurality of carbon dioxide concentrations of the plurality of battery cells using the carbon dioxide sensing system;
   detecting with the controller cathode overpotential when a difference between at least one of the plurality of carbon dioxide concentrations of the plurality of battery cells and an average carbon dioxide concentration of others of the plurality of battery cells is greater than a predetermined threshold; and altering with the controller at least one of charging or discharging parameters of the plurality of battery cells in response to detecting the cathode overpotential.

9. The method of claim 8, further comprising:
a) measuring a first carbon dioxide concentration of one of the plurality of battery cells prior to a charging event;
b) charging the one of the plurality of battery cells;
c) measuring a second carbon dioxide concentration of one of the plurality of battery cells after the charging event; and
d) detecting cathode overpotential when a difference between the second carbon dioxide concentration and the first carbon dioxide concentration is greater than a predetermined threshold.

10. The method of claim 9, further comprising:
determining a state of charge of the one of the battery cells; and performing (c) and (d) when the state of charge of the one of the battery cells is greater than a predetermined state of charge.

11. The method of claim 8, further comprising altering at least one of charging or discharging parameters of the plurality of battery cells in response to detecting the cathode overpotential.

12. The method of claim 8, further comprising arranging carbon dioxide sensors arranged in each of the plurality of battery cells.

13. The method of claim 8, further comprising multiplexing a carbon dioxide sensor to the plurality of battery cells.

* * * * *